Feb. 5, 1924.
J E. HOFMANN
1,482,516
ATTACHMENT FOR CORN SHELLERS
Filed May 8, 1923
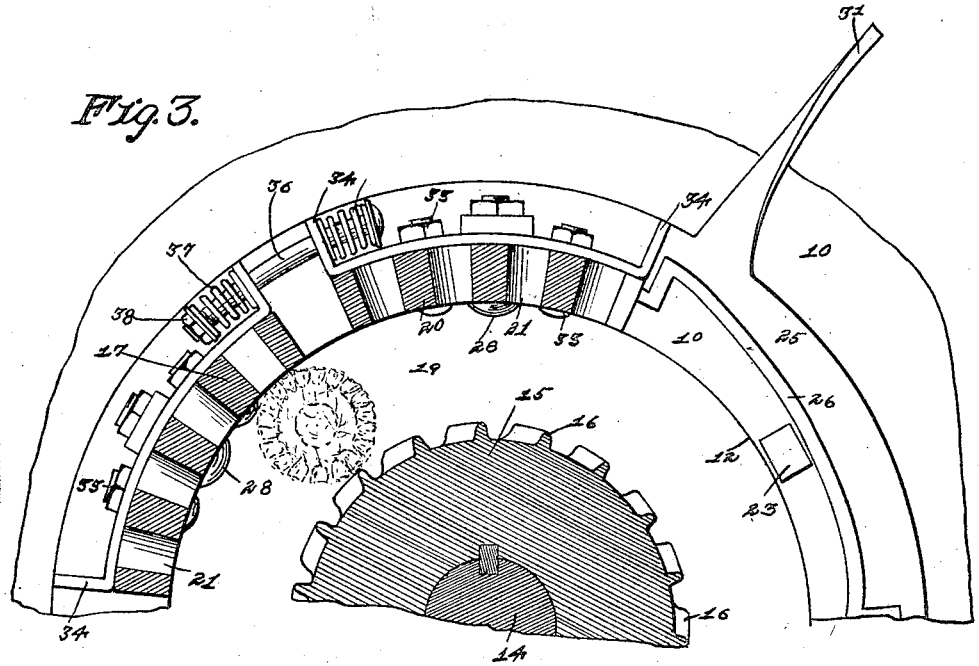
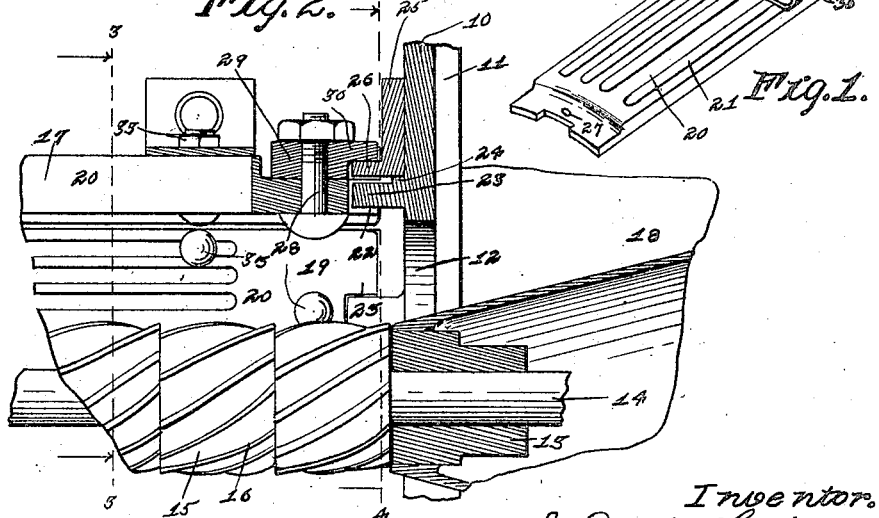
Inventor.
J. Emil Hofmann
by Orwig & Hager Attys.

Patented Feb. 5, 1924.

1,482,516

UNITED STATES PATENT OFFICE.

J EMIL HOFMANN, OF ORIENT, IOWA, ASSIGNOR OF ONE-HALF TO H. J. REHA, OF ORIENT, IOWA.

ATTACHMENT FOR CORN SHELLERS.

Application filed May 8, 1923. Serial No. 637,430.

*To all whom it may concern:*

Be it known that I, J EMIL HOFMANN, a citizen of the United States, and a resident of Orient, in the county of Adair, State of Iowa, have invented a certain new and useful Attachment for Corn Shellers, of which the following is a specification.

This invention relates to improvements in corn shellers of that type which employs a cylindrical sheller member mounted on a centrally located longitudinal shaft and rotatively mounted thereon. The sheller member being designed to operate longitudinally and centrally within a cylindrical cage formed of a series of sheller staves or concaves, said staves being provided with a series of longitudinally extending slotted openings. The said staves are provided with mechanical means for adjustably mounting them in such a manner that they may be moved toward or from the shelling cylinder. I have found in actual practice that this type of shellers wears very rapidly with use at the points where the shelling staves are in engagement with the operating mechanism to adjust and support the same, and that after the sheller has been used a short time, the staves cause a considerable trouble by moving out of alinement with the shelling cylinder, due to the excessive wear.

It is the object of my invention to provide improved means whereby the wearing qualities of this type of sheller will be materially increased.

A further object is to provide in this type of sheller, means for yieldably holding the adjacent edges of the sheller staves in operative relation with each other, so as to increase the efficiency of the apparatus and also the wearing qualities of the various parts.

A further object is to provide a device of simple, durable and inexpensive construction which may be easily and quickly applied to that type of shellers above referred to that have become worn to such an extent as to be useless, and when so applied, the device will work as efficiently as when new.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of one of the sheller staves of the type above referred to, and showing the manner in which my improvement is applied thereto.

Figure 2 is a vertical, longitudinal, sectional view of a segment of a sheller cage showing in elevation a segment of the sheller cylinder together with the manner in which it is mounted to the back hopper plate.

Figure 3 is an enlarged detail, transverse, sectional view, the left hand portion of which is taken on the line 3—3 of Figure 2, while the right hand portion is taken on the line 4—4 of Figure 2.

The numeral 10 indicates the back plate of the feed hopper which is mounted on the main frame 11 and provided with a feed opening 12.

Mounted on the frame 11 is a bearing 13 in which a shaft 14 is rotatively mounted perpendicular to the plate 10. On the shaft 14 is a series of sheller members 15 of a cylindrical shape and provided on their periphery with a series of sheller flanges 16.

The sheller members 15 are mounted longitudinally and centrally within a cylindrical cage 17. The corn which is to be shelled is fed in through the opening 12 from a hopper 18 into the annular space 19 between the cage 17 and the members 15.

The cage 17 is formed of a series of concavo-convex staves or plates 20, each of the plates being provided with a series of longitudinally arranged slots 21 through which the shelled corn may pass. The said slots are designed to form ribs to assist in removing the shelled corn. Each of the staves is provided at each end with a notch 22 designed to receive an inwardly extending lug 23 on the back face of the plate 10. These lugs are arranged one for each stave and in a circular manner concentric with the shaft 14.

Adjacent to the outer faces of the lugs 23 is an annular shoulder 24 designed to rotatively receive a collar 25 provided with a rearwardly extending flange 26. This flange 26 is formed of a series of segmental portions one for each of the staves 20. Each of the segmental portions is arranged eccentrically with the center of the shaft 14, as clearly shown in Figure 3.

Adjacent to the notch 22 is an opening 27 designed to receive a bolt 28 extending through a clamp member 29. This member is provided with a forwardly extending flange 30 designed to rest on the outer face of the segmental portions of the flange 26. The ends of the staves are mounted adjacent to the inner face of the flange 26. The member 29 is of such height that the flange 26 will be loosely mounted between the flange 30 and the end of the stave 27.

The member 25 is provided with an arm 31 by which the member 25 may be rotated on the shoulder 24. This rotary movement, it will be seen, will cause the staves 25 to move toward or from the cylindrical members 15, so as to adjust the space between the members 15 and the said staves for different size corn, and to meet the various working conditions.

It will be noted that as the members 15 are rotated and when corn is fed into the annular space between the said cylindrical members and the cage 17, the corn will be brought into contact with the cage in a circular movement, which will produce a tendency in the staves 20 to travel in the same direction of the cylinder 15.

It will be further noted that when corn enters between the said staves and the shelling cylinder, the said staves will be moved from the center of the cylinder. This results in a large amount of vibration and movement in these parts, in that one edge of the lugs 23 together with the coacting edges of the notches 22 soon become worn. This is partly due to the fact that it is impossible to lubricate these parts.

It will further be seen that after the said parts become worn a very large amount of circular play will be produced, which will also cause a large amount of wear on the under faces of the lugs 30 and the top faces of the flanges 26.

It will be observed in Figure 3 that all of the staves will have a natural tendency to move downwardly due to gravity. This will permit the staves at each side of the cylinder to move toward the staves in the bottom and large openings will be produced between the upper edges of the side staves and the upper stave, which makes it impossible to shell without cobs and similar obstructions being forced between the adjacent edges of the staves which get into the shelled corn and cause trouble.

Furthermore it will be seen that the various supporting flanges and lugs will be worn to such an extent that they will easily become broken.

The part of the mechanism above described forms no part of my invention, and is illustrated and described to show the manner in which my improvement is applied and the object of making the same.

I have found after considerable experimenting and studying, that a large amount of the above described difficulties may be very efficiently overcome by providing the following mechanism:

Secured to the front end of each of the staves 20 I have provided a segmental strap iron 32, which I secure in place by means of bolts 33 extending through the slots 21. The ends of each of the members 32 is provided with outwardly extending members 34, and each of said members being provided with an opening 35, clearly shown in Figure 1. The members 32 are arranged in such manner that the members 34 will be in circular alinement with each other.

Extending through the openings 35 of two adjacent members 34, I have provided a bolt 36, each of which is provided with a spring 37. The bolt 36 is provided with a nut 38 whereby the tension of the springs 37 may be varied.

By this arrangement it will be seen that the staves 20 will be yieldably held in proper spacing relative to each other and will always be yieldably held against outward movement. This relieves the pressure exerted on the ends of the staves and reduces the wear of those parts; and further, even if the supporting flanges have become worn, the spring still retains the staves in proper spacing so that the wearing qualities of the staves will be greatly increased.

It will, therefore, be seen that I have provided means of simple, durable and inexpensive construction which may be easily and quickly applied to shellers of the type above mentioned, and which, when applied, the life of the parts to which it is applied will be greatly increased, and also the efficiency of the sheller.

I claim as my invention:

1. In a device of the class described, a supporting frame, a sheller cage formed of a series of segmental staves arranged in a cylindrical plane, means for loosely mounting said staves with their edges adjacent and slightly spaced apart, and yieldable means for holding the staves against outward radial movement and against their adjacent edges being separated.

2. A pair of curved strap irons arranged in a common cylindrical plane with their ends adjacent, said adjacent ends being arranged in a radial manner and in the same direction, a bolt extending slidably between the two adjacent flanges, a spring for each outer end of said bolt designed to yieldably hold the flanges toward each other, a nut adjustably mounted on one end of said bolt, and means for attaching the said members to the staves of a sheller cage.

3. A stave for a sheller cage comprising a cylindrical segment having a series of longitudinal grooves and provided at each end with means for loosely mounting the stave within a suitable frame, one end of the stave being provided with radially extending lugs, each of said lugs being provided with an opening.

J EMIL HOFMANN.